United States Patent [19]
Eavenson et al.

[11] Patent Number: 6,070,690
[45] Date of Patent: Jun. 6, 2000

[54] CRUISE BAR AND METHOD OF DRIVING A ZERO TURN LAWN TRACTOR

[75] Inventors: Jimmy N. Eavenson, Aurora; Gerald Hobrath, Stongsville, both of Ohio

[73] Assignee: Commercial Turf Products, Streetsboro, Ohio

[21] Appl. No.: 09/018,674

[22] Filed: Feb. 4, 1998

[51] Int. Cl.[7] .............................. B60K 26/00; G05G 1/04
[52] U.S. Cl. ................................. 180/315; 74/526
[58] Field of Search ..................... 180/315, 333, 180/336; 74/526, 523

[56] References Cited

U.S. PATENT DOCUMENTS

| | | | |
|---|---|---|---|
| 1,458,013 | 6/1923 | Tampier . | |
| 5,277,017 | 1/1994 | Simone | 56/14.7 |
| 5,528,889 | 6/1996 | Kure et al. | 56/15.6 |
| 5,830,313 | 11/1998 | Smith | 156/584 |
| 5,870,889 | 2/1999 | Togoshi et al. | 56/320.2 |

FOREIGN PATENT DOCUMENTS

0443828A1  9/1991  European Pat. Off. ........ B62D 11/18

Primary Examiner—Brian L. Johnson
Assistant Examiner—Faye M. Fleming
Attorney, Agent, or Firm—Emerson & Associates; Roger D. Emerson; Timothy D. Bennett

[57] ABSTRACT

A cruise bar is provided for use with a lawn tractor. The lawn tractor includes a frame, a driving device for use in driving the lawn tractor, a first drive wheel for use in driving the lawn tractor, a console that is operatively connected to the frame, and a first control lever for use in controlling the speed and direction of the lawn tractor. The cruise bar is used to limit the motion of the first control lever. The first control lever is operatively connected to the driving device and to the first drive wheel. The first control lever is selectively moveable in a first direction. The cruise bar limits the motion of the first control lever in the first direction and is operatively connected to the console. The cruise bar may be adjusted relative to the first control lever thereby providing a method for limiting the top speed of the lawn tractor.

24 Claims, 3 Drawing Sheets

CRUISE BAR AND METHOD OF DRIVING A ZERO TURN LAWN TRACTOR

BACKGROUND OF THE INVENTION

1. Field of Invention

This invention pertains to the art of methods and apparatuses for use in lawn and garden care, and more specifically to methods and apparatuses for controlling the speed and direction of a zero turn lawn tractor.

2. Description of the Related Art

It is well known to provide lawn tractors having direction control such as a steering wheel and speed control such as a throttle pedal or lever. A relatively recent improvement is lawn tractors having zero radius turning capabilities. They are commonly referred to as zero turn tractors. A zero turn tractor may have two drive wheels, one on each side of the tractor, and two independent control levers. Each control lever controls the speed and the direction of one of the drive wheels. To make a zero radius turn it is necessary to drive one of the drive wheels in a first or forward direction while simultaneously driving the other drive wheel in a second or reverse direction. Such zero turn tractors have proven to be adequate for their intended purpose. Some problems, however, have been experienced.

One problem is called turfing. Turfing is the damage done to the ground or turf when an operator too abruptly turns a zero turn tractor. Operators have a tendency when turning a zero turn tractor to "turn" the control levers much like a steering wheel is turned. In other words, operators have a tendency to pull one control handle backwards while pushing the other control handle forward. This pull/push motion may cause the inside drive wheel to slide across the turf thereby damaging the turf. What is needed is a way to minimize turfing.

Another problem relates to the ergonomics of controlling a lawn tractor. Steering wheels of known lawn tractors actually provide at least two functions for the operator. One function is the steering control. The second function is that the steering wheel provides a resting surface to rest the operator's hands. For lawn tractors that do not have a steering wheel but rather have control levers, however, the operator's hands may not be rested on such control levers without the lawn tractor's speed and/or direction being inadvertently adjusted. Therefore, the operator's hands must be supported by the operator's arms and shoulders. This may prove to be tiring for the operator's arms, shoulders and back when the lawn tractor is driven for large amounts of time. What is needed is a way of utilizing independent control levers while still providing a means for resting the operators hands and thus his arms, shoulders and back.

Another problem is that known zero turn lawn tractors do not permit the limiting of the top speed below the limits of the lawn tractor itself. In other words, only by maintaining the operator's hands at specific positions with respect to the control levers can the zero turn lawn tractor be maintained at a predetermined top speed. What is needed is a simple way for the operator to maintain the lawn tractor at a given top speed.

The present invention provides methods and apparatuses for reducing these problems. The difficulties inherent in the art are therefore overcome in a way that is simple and efficient while providing better and more advantageous overall results.

SUMMARY OF THE INVENTION

According to one aspect of the invention, a lawn tractor includes a frame, driving means for use in driving the lawn tractor, a first drive wheel for use in driving the lawn tractor, a console that is operatively connected to the frame, a first control lever for use in controlling the speed and direction of the lawn tractor, and a cruise bar for use in limiting the motion of the first control lever. The first control lever is operatively connected to the driving means and to the first drive wheel. The first control lever is selectively moveable in a first direction. The cruise bar limits the motion of the first control lever in the first direction. The cruise bar is operatively connected to the console.

According to another aspect of the invention, the lawn tractor may further comprise adjusting means for adjusting the position of the cruise bar. The preferred adjusting means includes a first adjustment bolt for use in locking the cruise bar in position with respect to the console. The first adjustment bolt is operatively received by a first opening in the cruise bar and a first slot in the console. The first adjustment bolt is selectively slidable within the first slot of the console as the cruise bar is pivoted about its ends.

According to another aspect of this invention, there is provided a method for driving a lawn tractor. First, the operator's hands are rested on the cruise bar. Next, the operator squeezes the first control lever towards the cruise bar with a first hand and simultaneously squeezes the second lever towards the cruise bar with a second hand. When the first and second control levers contact the cruise bar, the speed of the lawn tractor is limited.

One advantage of the present invention is that the tendency for turfing is greatly reduced. This is true because the cruise bar makes it easy for the operator to turn the lawn tractor without the push/pull motion discussed above.

Another advantage of the present invention is that the cruise bar provides a better ergonomic design for a lawn tractor having control levers.

Another advantage of the present invention is that the top speed of the lawn tractor can be easily limited.

Still another advantage of the present invention is that the position of the cruise bar can be easily adjusted.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings, which form a part hereof and wherein.

DESCRIPTION OF THE PREFERRED EMBODIMENT

Figure 1:
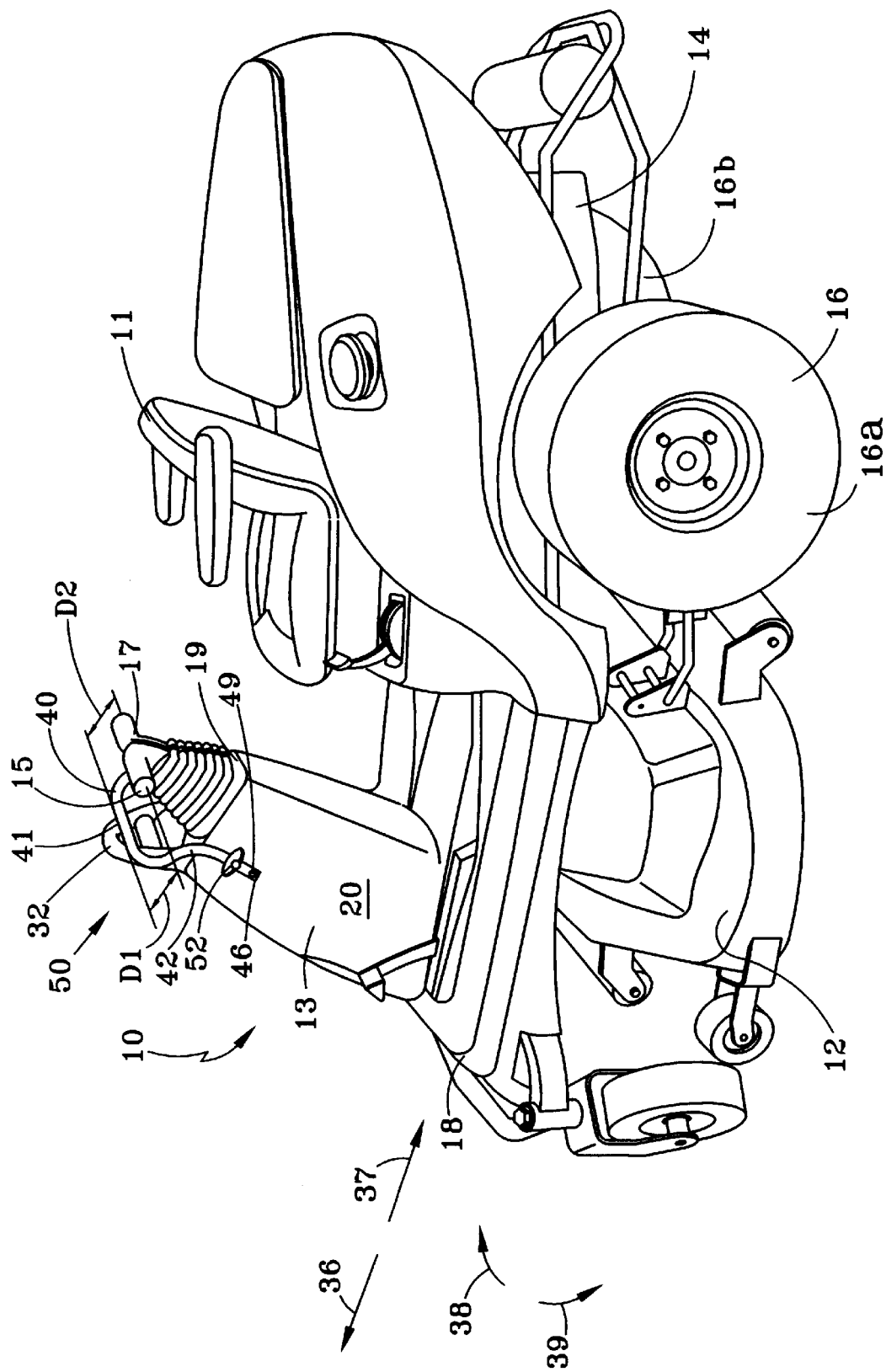
FIG. 1 is a perspective side view of a lawn tractor showing the cruise bar of this invention.
Figure 2:
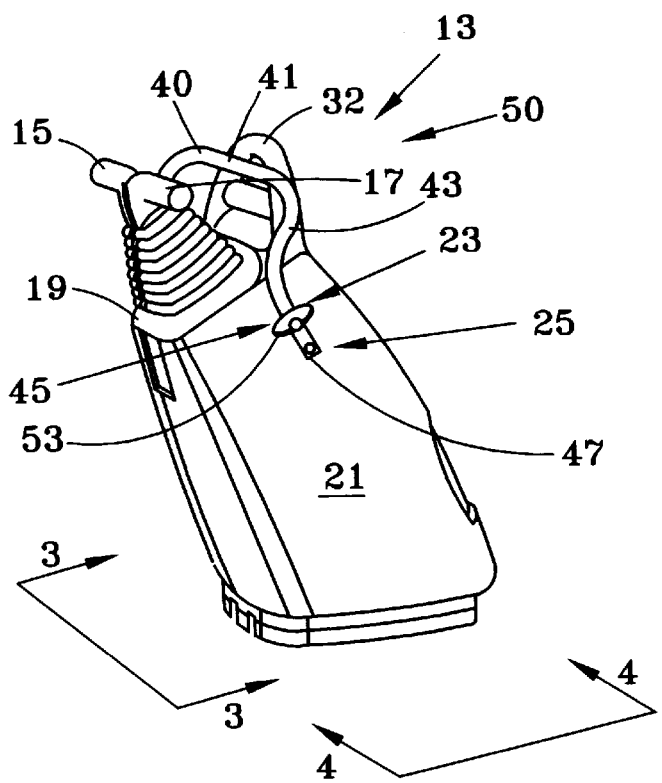
FIG. 2 is a perspective side view of the console showing the first and second control levers, the cruise bar, and the handle.
Figure 3:
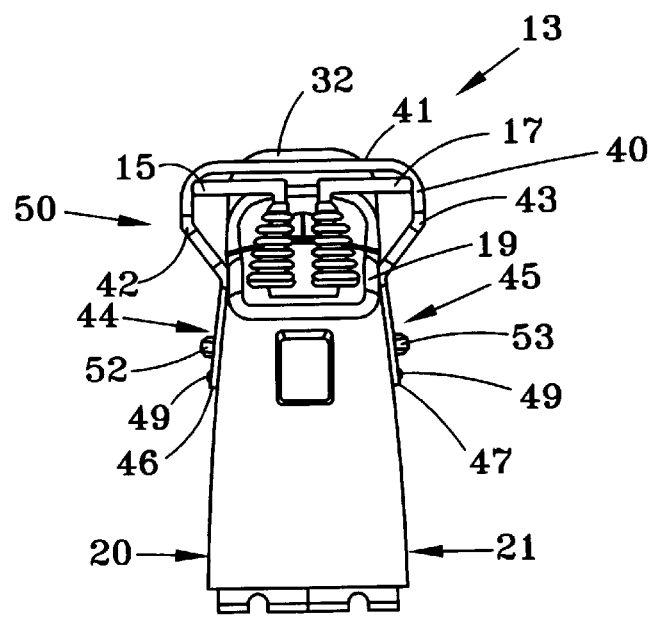
FIG. 3 is a back view of the console taken along the line 3—3 of FIG. 2 showing the first and second leg members of the cruise bar.
Figure 4:
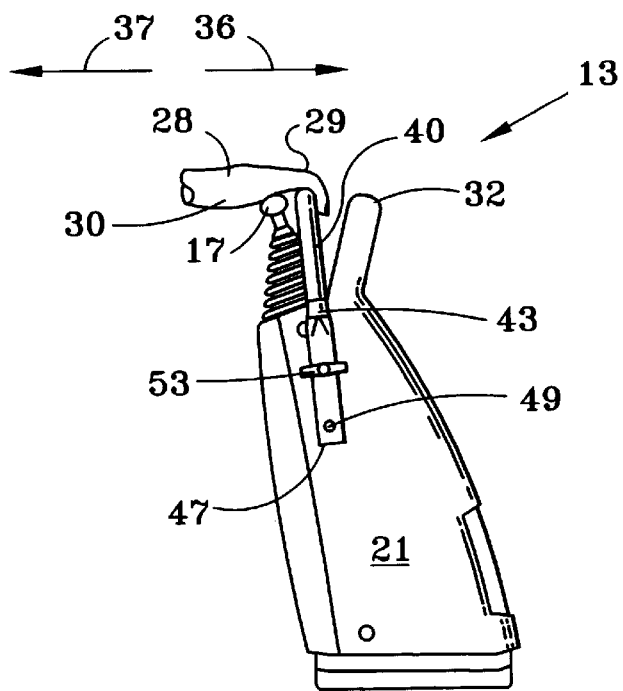
FIG. 4 is a side view of the console taken along the line 4—4 of FIG. 2 showing how an operator's hand is positioned in order to squeeze the control lever toward the cruise bar.
Figure 5:
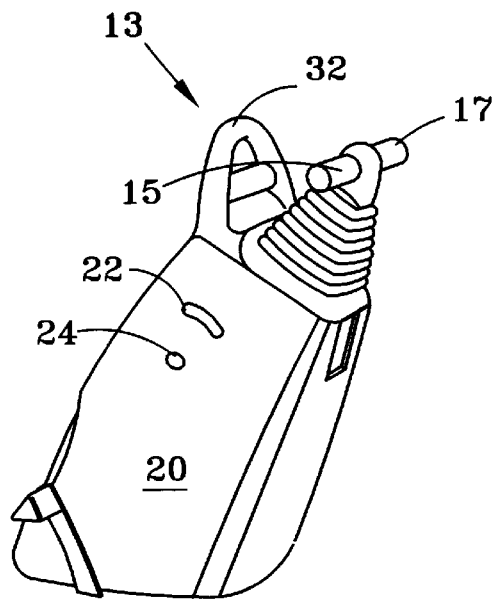
FIG. 5 is a perspective side view of the console shown with the cruise bar removed and showing the first slot and first hole on the first side of the console.

Referring now to the drawings wherein the showings are for purposes of illustrating a preferred embodiment of the invention only and not for purposes of limiting the same, FIG. 1 shows a lawn tractor 10 that is equipped with the present invention, a cruise bar 40. This preferred embodiment is directed to a lawn tractor but the invention is applicable to other vehicles and other applications as well. The lawn tractor 10 has an operator seat 11 and a console 13 both operatively mounted to a frame 18. The lawn tractor may also have a mower deck 12 suspended from the frame 18 for use in cutting vegetation as is commonly known in the art. A driving means 14 is also mounted to the frame 18. The driving means 14 can be of any type currently used in the art such as an engine and provides rotation for one or more drive wheels 16 as is commonly known in the art. The preferred embodiment shown in FIG. 1 includes first and second drive wheels 16a, 16b.

With reference now to FIGS. 1–5, it should be noted that the embodiment shown is a lawn tractor 10 having zero radius turning capabilities. In other words, the lawn tractor 10 is a zero turn tractor. However, it is not a requirement for this invention that the lawn tractor 10 be a zero turn tractor. The first and second drive wheels 16a, 16b are independently controlled for speed and direction of rotation by first and second control levers 15, 17 respectively. The operative connections between the first and second control levers 15, 17, the driving means 14, and the first and second drive wheels 16a, 16b can be of any type currently known in the art and therefore will not be discussed further. When the first control lever 15 is moved in a first direction 36 it causes the first drive wheel 16a to rotate in a first direction (counterclockwise as shown in FIG. 1) to move the lawn tractor in the first direction 36. When the first control lever 15 is moved by the operator in a second direction 37, it causes the first drive wheel 16 to rotate in a second direction (clockwise as shown in FIG. 1) to move the lawn tractor 10 in the second direction 37. When the operator releases the first control lever 15 it automatically moves to a neutral position thereby ceasing to drive the first drive wheel 16a. The second control lever 17 is similarly operated with regard to the second drive wheel 16b. It should also be readily understood that, as is commonly known in the art, control levers such as the levers 15, 17 move within a finite range of motion limited in both first and second directions by internal linkages and the like (not shown) or a later-to-be-described console 13. This finite range of motion is a typical design feature and is generally not adjustable by the operator.

With continuing reference to FIGS. 1–5, the console 13 has first and second sides 20, 21 and a first end 19. It should be noted that the first and second control levers 15, 17 extend through the first end 19 of the console 13 though a console 13 is not required for this invention. The first and second sides 20, 21 of the console 13 have first and second slots 22, 23 and first and second holes 24, 25 respectively for use in connecting to the cruise bar 40 as will be discussed further below. The lawn tractor 10 may also have a handle 32 attached to the console 13 that extends upward from the first end 19 of the console 13. The handle 32 is not required for this invention but can be used to limit the position of the cruise bar 40 as will be discussed further below.

With reference now to FIGS. 1–4, the cruise bar 40 can be of any size and shape chosen with sound engineering judgement. Preferably, the cruise bar 40 is U shaped with a cross member 41 connected to first and second leg members 42, 43. The cruise bar 40 is connected to the first and second sides of the console 20, 21 through the first and second ends 46, 47 of the first and second leg members 42, 43. The cruise bar 40 is positioned laterally spaced from the first and second control levers 15, 17 as shown in the FIGURES thereby providing a limit to the motion of the first and second control levers 15, 17 in the first direction 36. It should be understood that the cruise bar 40 could be mounted on the opposite side of the first and second control levers 15, 17 thereby limiting the motion of the first and second control levers 15, 17 in the second direction 37. In either case the cruise bar 40 limits the movement of the levers 15, 17 within the previously described finite range of motion.

With reference now to FIGS. 1–5, the lawn tractor 10 in this preferred embodiment also has adjusting means 50 for adjusting the position of the cruise bar 40. In this case the first and second ends 46, 47 of the cruise bar 40 are pivotably attached to the first and second sides 20, 21 of the console 13 such as by placing pivot bolts 39 through the first and second ends 46, 47 and through the first and second holes 24, 25 of the console 13. The adjusting means 50 may include first and second adjustment bolts 52, 53 that are received within first and second openings 44, 45 in the first and second leg members 42, 43 as well as in the first and second slots 22, 23 in the console 13. Preferably the first and second adjustment bolts 52, 53 can be manually tightened and loosened. By tightened and loosened it is meant that the first and second adjustment bolts 52, 53 can be selectively tightened thereby locking the cruise bar 40 in position and selectively loosened thereby permitting the cruise bar 40 to be pivoted about the pivot bolts 49. It should also be noted that only one adjustment bolt is required for this invention.

With reference now to FIGS. 1–4, to drive the lawn tractor 10 the operator sits in the operator seat 11 and places his hands 28 such that the finger portions 29 of the hands 28 rest on the cruise bar 40 while the palm portions 30 of the hands 28 rest on the first and second control levers 15, 17. The operator may also wrap his thumbs (not shown) around the first and second control levers 15, 17. Thus, this invention provides an ergonomic benefit as the operator's hands 28 can be rested on the cruise bar 40. This minimizes potential strain and tiredness in the operator's arms, shoulders and back (not shown) that may occur without a cruise bar 40 as discussed above. In fact, before operating the lawn tractor 10, the operator may rest his hands 28 entirely on the cruise bar 40. To move the lawn tractor 10 in first direction 36, the operator squeezes the first control lever 15 towards the cruise bar 40 with one hand 28 while simultaneously squeezing the second control lever 17 toward the cruise bar 40 with the other hand 28. This motion of the first and second control levers 15, 17 causes the first and second drive wheels 16a, 16b to rotate such that the lawn tractor 10 moves in the first direction 36.

With continuing reference to FIGS. 1–4, to turn the lawn tractor 10 it is only necessary that the operator move one of the control levers closer to the cruise bar 40 than the other control lever. To assist in visualizing this, FIG. 1 shows that the first control lever 15 is laterally spaced a first distance D1 from the cruise bar 40 and that the second control lever 17 is spaced a second distance D2 from the cruise bar 40. Thus, for example, to turn the lawn tractor 10 in third direction 38 it is only necessary that the operator move the first control lever 15 closer to the cruise bar 40 than the second control lever 17 is to the control bar 40. In other words, the first distance D1 must be less than the second distance D2. This causes the first drive wheel 16a to rotate at a faster speed that the second drive wheel 16b and therefore causes the lawn tractor to turn in the third direction 38.

Still referring to FIGS. 1–4, it should be noted that the second control lever 17 may have any one of three general positions with respect to the first control lever 15 while still causing the lawn tractor 10 to turn in the third direction 38. The first possible position for the second control lever 17 is that it may be positioned toward the first direction 36. In this case both the first and second drive wheels 16a, 16b continue to drive the lawn tractor in the first direction 36. This is possible as long as the second distance D2 is greater than first distance D1. The second possible position for the second control lever 17 is that it may be positioned in a neutral position as discussed above. In this case it is only necessary for the operator to release the second control lever 17 (it will automatically return to the neutral position) and the lawn tractor 10 will turn in the third direction 38. In this way the problem of turfing, described above, can be easily avoided. The third possible position for the second control lever 17 is that it may be positioned toward the second direction 37. In other words, the second drive wheel 16b will be rotated in a direction opposite to that of the first drive wheel 16a. This is the position required to obtain zero radius turning capabilities.

With continuing reference to FIGS. 1–4, to turn the lawn tractor 10 in a fourth direction 39 the operator must move the second control lever 17 closer to the cruise bar 40 than the first control lever 15 is to the cruise bar 40. In other words, the second distance D2 must be less than the first distance D1. The first control lever 15 may have any one of the three general positions with respect to the second control lever 17 mentioned above for the second control lever 17.

Still referring to FIGS. 1–4, it should be noted that the cruise bar 40 can be used to limit the top speed of the lawn tractor 10. This is true because as shown best in FIG. 4, as the first and second control levers 15, 17 are moved in the first direction 36 they eventually contact the cruise bar 40 where their motion is stopped. This is a very convenient use of the cruise bar 40 for the operator. The lawn tractor 10, for example, may have a top speed of 10 miles per hour. It may be desirable, however, to limit the top operating speed to, for example, 6 miles per hour. Possible reasons for this limit may include an inexperienced operator, hilly terrain, personal preference, etc. By adjusting the position of the cruise bar 40, the top speed can be varied. This also makes it easy for the operator to return to the desired speed by simply squeezing the first and second control levers 15, 17 against the cruise bar 40.

With continuing reference to FIGS. 1–4, to adjust the position of the cruise bar 40 and thus to adjust the top speed limit for the lawn tractor 10, it is only necessary to loosen the first and second adjustment bolts 52, 53 pivot the cruise bar 40 about the pivot bolts 49 thereby the moving the first and second adjustment bolts 52, 53 within the first and second slots 22, 23 of the console 13 then tighten the first and second adjustment bolts 52, 53. The cruise bar 40 can thus be adjusted in either the first or second directions 36, 37. With the cruise bar 40 oriented as shown in the FIGURES, an adjustment in the first direction 36 would increase the top speed limit of the lawn tractor 10 and an adjustment in the second direction 37 would decrease the top speed limit. It should also be noted that the handle 32 can be used to limit the adjustable range of the cruise bar 40 in the first direction 36. In other words, the cruise bar 40 cannot be adjusted in the first direction 36 beyond the handle 32.

The invention has been described in with reference to the preferred embodiment. Obviously, modifications and alterations will occur to others upon a reading and understanding of the specification. It intended by the applicant to include all such modifications and alterations in so far as they come within the scope of the appended claims or the equivalents thereof. Having thus described the invention, it is now claimed:

What is claimed is:

1. A lawn tractor comprising:

a frame;

driving means for use in driving the lawn tractor, said driving means being operatively mounted to said frame;

a first drive wheel for use in driving the lawn tractor, said first drive wheel being operatively connected to said frame, said first drive wheel being selectively rotated by said driving means;

a first control lever for use in controlling the speed and direction of the lawn tractor, said first control lever being operatively connected to said driving means and to said first drive wheel, said first control lever being selectively movable in a first direction, said first lever having a finite range of motion in said first direction; and, limiting means for limiting the motion of said first control lever within said finite range of motion in said first direction, said limiting means being operatively connected to said frame.

2. The lawn tractor of claim 1 further comprising:

adjusting means for adjusting the position of said limiting means with respect to said frame.

3. The lawn tractor of claim 1, wherein said first control lever is selectively movable in a second direction and said limiting means limits the motion of said first control lever in said second direction.

4. The lawn tractor of claim 1 wherein said limiting means comprises:

a cruise bar.

5. A lawn tractor comprising:

a frame;

driving means for use in driving the lawn tractor, said driving means being operatively mounted to said frame;

a first drive wheel for use in driving the lawn tractor, said first drive wheel being operatively connected to said frame, said first drive wheel being selectively rotated by said driving means;

a first control lever for use in controlling the speed and direction of the lawn tractor, said first control lever being operatively connected to said driving means and to said first drive wheel, said first control lever being selectively movable in a first direction;

a cruise bar for use in limiting the motion of said first control lever in said first direction, said cruise bar being operatively connected to said frame; and, a console that is operatively connected to said frame, said console having a first end, said first control lever extending through said first end of said console, said cruise bar being operatively connected to said console.

6. The lawn tractor of claim 5 wherein said console has a first side with a first slot, said cruise bar having a first opening and a first end that is pivotably connected to said first side of said console, the lawn tractor further comprising:

adjusting means for adjusting the position of said cruise bar, said adjusting means including a first adjustment bolt for use in locking said cruise bar in position with respect to said console, said first adjustment bolt being operatively received by said first opening of said cruise bar and said first slot of said console, said first adjustment bolt being selectively slidable within said first slot of said console.

7. The lawn tractor of claim 6 further comprising:

a second drive wheel for use in driving the lawn tractor, said second drive wheel being operatively connected to said frame, said second drive wheel being selectively rotated by said driving means;

said console having a second side with a second slot;

a second control lever for use in controlling the speed and direction of the lawn tractor, said second control lever being operatively connected to said driving means and to said second drive wheel, said second control lever being selectively movable in said first direction, said second control lever extending through said first end of said console;

said cruise bar for use in limiting the motion of said second control lever in said first direction, said cruise bar being U shaped and having first and second leg members and a cross member, said first leg member having said first opening and said first end that is pivotably connected to said first side of said console, said second leg member having a second opening and a second end that is pivotably connected to said second side of said console; and, said adjusting means including a second adjustment bolt for use in locking said cruise bar in position with respect to said console, said second adjustment bolt being operatively received by said second opening of said cruise bar and said second slot of said console, said second adjustment bolt being selectively slidable within said second slot of said console.

8. The lawn tractor of claim 7 further comprising:

a handle extending from said first end of said console, said handle for use in limiting the adjustment of said cruise bar.

9. The lawn tractor of claim 8 wherein said cross member of said cruise bar is positioned between said first and second control levers and said handle.

10. A method of driving a lawn tractor having a frame, driving means for use in driving the lawn tractor, first and second drive wheels for use in driving the lawn tractor, first and second control levers that are selectively movable for use in controlling the speed and direction of the lawn tractor, and a cruise bar for use in limiting the motion of said first and second control levers, said first and second control levers being operatively connected to said driving means and to said first and second drive wheels respectively, the method comprising the steps of:

resting first and second hands on said cruise bar;

squeezing said first control lever toward said cruise bar with said first hand without removing said first hand from said cruise bar; and, squeezing said second control lever toward said cruise bar with said second hand without removing said second hand from said cruise bar.

11. A method of limiting the speed of a lawn tractor having a frame, driving means for use in driving the lawn tractor, a first drive wheel for use in driving the lawn tractor, a first control lever that is selectively movable for use in controlling the speed and direction of the lawn tractor, and a cruise bar for use in limiting the motion of said first control lever, said first control lever being operatively connected to said driving means and to said first drive wheel, the method comprising the steps of:

resting a first hand on the cruise bar;

squeezing the first control lever toward the cruise bar with the first hand without removing the first hand from said cruise bar;

contacting the first control lever against the cruise bar thereby limiting the motion of the first control lever.

12. The method of claim 11 wherein the lawn tractor also has a second drive wheel for use in driving the lawn tractor and a second control lever that is selectively movable for use in controlling the speed and direction of the lawn tractor, the cruise bar also for use in limiting the motion of the second control lever, the second control lever being operatively connected to the driving means and to the second drive wheel, after the step of squeezing the first control lever toward the cruise bar with the first hand without removing the first hand from the cruise bar, the method comprises the steps of:

resting a second hand on the cruise bar;

squeezing the second control lever toward the cruise bar with the second hand without removing the second hand from the cruise bar;

contacting the second control lever against the cruise bar thereby limiting the motion of the second control lever.

13. A lawn tractor comprising:

a frame;

driving means for use in driving the lawn tractor, said driving means being operatively mounted to said frame;

a first drive wheel for use in driving the lawn tractor, said first drive wheel being operatively connected to said frame, said first drive wheel being selectively rotated by said driving means;

a first control lever for use in controlling the speed and direction of the lawn tractor, said first control lever being operatively connected to said driving means and to said first drive wheel, said first control lever being selectively movable in a first direction; and, limiting means for limiting the motion of said first control lever in said first direction, said limiting means being operatively connected to said frame.

14. The lawn tractor of claim 13 further comprising:

a console that is operatively connected to said frame, said console having a first end, said first control lever extending through said first end of said console, said cruise bar being operatively connected to said console.

15. The lawn tractor of claim 14 wherein said console has a first side with a first slot, said cruise bar having a first opening and a first end that is PivotTable connected to said first side of said console, the lawn tractor further comprising:

adjusting means for adjusting the position of said cruise bar, said adjusting means including a first adjustment bolt for use in locking said cruise bar in position with respect to said console, said first adjustment bolt being operatively received by said first opening of said cruise bar and said first slot of said console, said first adjustment bolt being selectively slidable within said first slot of said console.

16. The lawn tractor of claim 13 further comprising:

adjusting means for adjusting the position of said limiting means with respect to said frame.

17. The lawn tractor of claim 13 wherein said limiting means comprises:

a cruise bar.

18. The lawn tractor of claim 13 wherein said cruise bar is positioned laterally spaced from said first control lever.

19. The lawn tractor of claim 13 wherein said first control lever is selectively movable in a second direction and said limiting means limits the motion of said first control lever in said second direction.

20. A lawn tractor comprising:

a frame;

driving means for use in driving the lawn tractor, said driving means being operatively mounted to said frame;

a first drive wheel for use in driving the lawn tractor, said first drive wheel being operatively connected to said frame, said first drive wheel being selectively rotated by said driving means;

a first control lever for use in controlling the speed and direction of the lawn tractor, said first control lever being operatively connected to said driving means and to said first drive wheel, said first control lever being selectively movable in a first direction; and, a cruise bar positioned laterally spaced from said first control lever thereby limiting the motion of said first control lever in said first direction.

21. The lawn tractor of claim 20 further comprising:

adjusting means for selectively adjusting said cruise bar into any of a plurality of laterally spaced positions from said first control lever.

22. A method of driving a lawn tractor having a frame, driving means for use in driving the lawn tractor, first and second drive wheels for use in driving the lawn tractor, first and second control levers that are selectively movable for use in controlling the speed and direction of the lawn tractor, and a cruise bar for use in limiting the motion of said first and second control levers, said first and second control levers being operatively connected to said driving means and to said first and second drive wheels respectively, the method comprising the steps of:

grasping said cruise bar with an appendage;

simultaneously grasping said first control lever with said appendage; and, squeezing said first control lever toward said cruise bar with said appendage.

23. The method of claim 22 wherein the step of squeezing said first control lever toward said cruise bar with said appendage, includes the step of:

leaving said second control lever in an unaffected position.

24. The method of claim 22 further comprising the steps of:

grasping said cruise bar with a second appendage;

simultaneously grasping said second control lever with said second appendage; and, squeezing said second control lever toward said cruise bar with said second appendage.

* * * * *